(12) United States Patent
Yang et al.

(10) Patent No.: US 11,264,821 B2
(45) Date of Patent: Mar. 1, 2022

(54) BIDIRECTIONAL ON-BOARD CHARGER AND METHOD OF CONTROLLING THE SAME

(71) Applicants: Hyundai Motor Company, Seoul (KR); Kia Motors Corporation, Seoul (KR)

(72) Inventors: Si-Hun Yang, Gyeonggi-do (KR); Jong-Pil Kim, Gyeonggi-do (KR); Jin-Young Yang, Gyeonggi-do (KR); Jin-Myeong Yang, Gyeonggi-do (KR); Woo-Young Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 207 days.

(21) Appl. No.: 16/693,632

(22) Filed: Nov. 25, 2019

(65) Prior Publication Data
US 2020/0313441 A1    Oct. 1, 2020

(30) Foreign Application Priority Data

Mar. 26, 2019  (KR) .......................... 10-2019-0034323

(51) Int. Cl.
| | |
|---|---|
| *H02J 7/00* | (2006.01) |
| *H02M 1/42* | (2007.01) |
| *H02M 3/335* | (2006.01) |
| *B60L 53/22* | (2019.01) |
| *H02M 1/44* | (2007.01) |

(52) U.S. Cl.
CPC .............. *H02J 7/007* (2013.01); *B60L 53/22* (2019.02); *H02M 1/4225* (2013.01); *H02M 3/33569* (2013.01); *B60L 2210/10* (2013.01); *H02J 2207/20* (2020.01); *H02M 1/44* (2013.01)

(58) Field of Classification Search
CPC .... H02J 7/007; H02J 2207/20; H02M 1/4225; H02M 1/44; H02M 3/33569; B60L 53/22
USPC ......................................................... 320/109
See application file for complete search history.

(56) References Cited

U.S. PATENT DOCUMENTS

| | | | | |
|---|---|---|---|---|
| 10,847,991 | B2 * | 11/2020 | He et al. ................. | H02J 7/342 |
| 11,050,354 | B2 * | 6/2021 | Escudero Rodriguez et al. .......... B60L 58/18 | |
| 2021/0067048 | A1 * | 3/2021 | Zhang ..................... | B60L 50/66 |
| 2021/0099097 | A1 * | 4/2021 | Zhang .................... | G01R 19/25 |

* cited by examiner

*Primary Examiner* — Sun J Lin
(74) *Attorney, Agent, or Firm* — Mintz Levin Cohn Ferris Glovsky and Popeo, P.C.; Peter F. Corless

(57) ABSTRACT

The present invention relates to a bidirectional on-board charger (OBC) and a method of controlling the same. The bidirectional on-board charger according to the present invention includes: an input power source which is a power source of a charging control system; a power factor corrector (PFC) which is connected to the input power source; a direct current/direct current (DC/DC), circuit which is connected to the power factor corrector and includes a switching unit and an output terminal; a first switch which is On/Off controlled to connect any one of: a first line for connecting the input power source and the power factor corrector and a second line for connecting the power factor corrector and an output terminal of the DC/DC circuit; and a second switch which is disposed between the switching unit and the output terminal of the DC/DC circuit and On/Off controlled.

11 Claims, 4 Drawing Sheets

BIDIRECTIONAL ON-BOARD CHARGER AND METHOD OF CONTROLLING THE SAME

CROSS-REFERENCE TO RELATED APPLICATIONS

This application claims priority under 35 U.S.C. § 119 to Korean Patent Application No. 10-2019-0034323, filed on Mar. 26, 2019, the disclosure of which is incorporated herein by reference in its entirety.

BACKGROUND

1. Field of the Invention

The present invention relates to a bidirectional on-board charger and a method of controlling the same, and more particularly, to a method of improving power conversion efficiency without increasing a size and material costs by applying two switches to a structure of a unidirectional on-board charger structure and enabling a bidirectional power transfer.

2. Description of the Related Art

Recently, there is a rapidly increasing demand for environmentally-friendly vehicles in the vehicle market. A charging device for charging a high-voltage battery is required for an electric vehicle (EV) and a plug-in hybrid electric vehicle (PHEV) which are environmentally-friendly vehicles.

The charging devices are classified into on-board chargers (OBCs) and rapid chargers. The on-board chargers, which are standardized and interchangeable regardless of types of vehicles, charge the battery by supplying general and commercially available alternating current power (e.g., 220 V) to the vehicle. An on-board charger refers to a device that charges the high-voltage battery using a portable charging cable (e.g., in-cable control box, ICCB) by being supplied with electrical energy (e.g., alternating current (AC) power) from electric vehicle supply equipment (EVSE). A charging time of about 4 to 6 hours is required in accordance with battery capacities. The rapid charger, which charges the battery using an external power supplier, charges the battery by variably supplying the electric vehicle with a direct current voltage of about 100 to 450 V, and the charging time for high-voltage and high-capacity charging is decreased compared to the on-board charger (e.g., about 30 minutes to 40 minutes).

As the use of the environmentally-friendly vehicles expands as described above, there is an active trend to cope with emergency power using an energy resource in a smart grid. To transfer power to the smart grid, a bidirectional charging system for transferring power reversely to the grid from the battery is required to be applied to the OBC having a unidirectional power circuit structure in the related art.

However, circuits and components need to be added to change the unidirectional OBC in the related art to the bidirectional OBC, but if the circuits and the components are added in this manner, a size and material costs are increased.

SUMMARY

The present invention provides a method and an apparatus for improving power conversion efficiency without increasing a size and material costs by applying two switches to a unidirectional on-board charger structure and enabling a bidirectional power transfer.

Technical problems to be solved by the present disclosure are not limited to the above-mentioned technical problems, and other technical problems, which are not mentioned above, may be clearly understood from the following descriptions by those skilled in the art to which the present disclosure pertains.

An exemplary embodiment of the present invention provides a bidirectional on-board charger that may include: an input power source which is a power source of a charging system; a power factor corrector (PFC) connected to the input power source; a direct current/direct current (DC/DC) circuit connected to the power factor corrector and that may include a switching unit and an output terminal; a first switch which connects any one of a first line for connecting the input power source and the power factor corrector and a second line for connecting the power factor corrector and an output terminal of the DC/DC circuit; and a second switch disposed between the switching unit and the output terminal of the DC/DC circuit and configured to selectively connect the switching unit and the output terminal.

In the exemplary embodiment, the first switch may be turned on and the second switch may be turned off to connect the first line during a charging operation. In addition, the first switch may be turned on and the second switch may be turned on to connect the second line during a discharging operation.

Another exemplary embodiment of the present invention provides a bidirectional on-board charger that may include: an input power source which is a power source of a charging system; a power factor corrector (PFC) connected to the input power source; a DC/DC circuit connected to the power factor corrector and that may include a switching unit and an output terminal; a third switch disposed between the input power source and an input terminal of the power factor corrector and configured to selectively connect the input power source and the input terminal of the power factor corrector; a fourth switch disposed between the input power source and an output terminal of the DC/DC circuit and configured to selectively connect the input power source and the output terminal of the DC/DC circuit; and a fifth switch disposed between the switching unit and the output terminal of the DC/DC circuit and configured to selectively connect the switching unit and the output terminal.

In the exemplary embodiment, the third switch may be turned on, the fourth switch may be turned off, and the fifth switch may be turned off during a charging operation. In addition, the third switch may be turned off, the fourth switch may be turned on, and the fifth switch may be turned on during a discharging operation. The power factor corrector may be a 3-leg PFC for three-phase charging. In the exemplary embodiment, the DC/DC circuit may include an electric transformer, a full bridge at a primary side of the electric transformer, a bridge diode at a secondary side of the electric transformer, and a capacitor of the output terminal. A high-voltage battery may be connected to the output terminal of the DC/DC circuit.

Still another exemplary embodiment of the present invention provides a method of controlling a bidirectional on-board charger that may include; turning on a first switch included in a power factor corrector of the on-board charger to connect a first line for connecting an input power source and the power factor corrector of the on-board charger; turning off a second switch connected between a switching unit and an output terminal of a DC/DC circuit of the on-board charger; and starting, by the on-board charger, a charging operation when the first switch is turned on and the second switch is turned off to connect the first line.

Yet another exemplary embodiment of the present invention provides a method of controlling a bidirectional on-board charger that may include: turning on a first switch included in a power factor corrector of the on-board charger to connect a second line for connecting the power factor corrector and an output terminal of a DC/DC circuit of the on-board charger; turning on a second switch connected between a switching unit and the output terminal of the DC/DC circuit; and starting, by the on-board charger, a discharging operation when the first switch is turned on and the second switch is turned on to connect the second line.

The effects of the bidirectional OBC and the method of controlling the same according to the present invention will be described below.

First, the circuits and the components needed to be added and the topology needed to be changed to transfer bidirectional power in the related, but according to the present invention, it may be possible to transfer the bidirectional power by merely adding the two switches to the circuit of the OBC in the related art.

Second, according to the present invention, with the two-stage circuit configuration, it may be possible to improve power conversion efficiency by about 1% when transferring the bidirectional power in comparison with the circuit of the OBC in the related art.

Third, according to the present invention, it may be possible to transfer the bidirectional power by adding the two switches to the circuit of the unidirectional OBC in the related art, and as a result, it may be possible to reduce material costs and a size in comparison with the circuit in the related art.

The effects obtained by the present disclosure are not limited to the aforementioned effects, and other effects, which are not mentioned above, will be clearly understood by those skilled in the art from the following description.

BRIEF DESCRIPTION OF THE DRAWINGS

The following accompanying drawings are provided to help understand the present invention, and exemplary embodiments of the present invention are provided together with the detailed description. However, technical features of the present invention are not limited to the particular drawings, and the features illustrated in the respective drawings may be combined to constitute a new exemplary embodiment.

DETAILED DESCRIPTION

Figure 1:
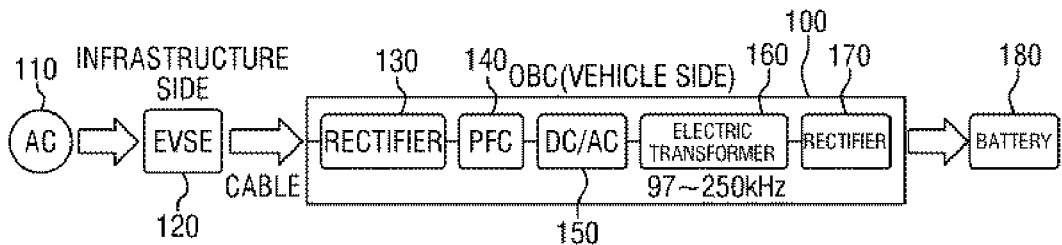
FIG. 1 is a schematic view illustrating a unidirectional charging system that operates an electric vehicle battery only in a charging mode using power grid electricity in the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present invention will be described in detail with reference to the accompanying drawings. However, the present invention is not restricted or limited by exemplary embodiments. Like reference numerals indicated in the respective drawings refer to members which perform substantially the same functions.

An object and an effect of the present invention may be naturally understood or may become clearer from the following description, and the object and the effect of the present invention are not restricted only by the following description. In addition, in the description of the present invention, the specific descriptions of publicly known technologies related with the present invention will be omitted when it is determined that the specific descriptions may unnecessarily obscure the subject matter of the present invention.

The methods of charging environmentally-friendly vehicles may be classified into a rapid charging method and a slow charging method. During a slow charging operation, an on-board charger (OBC) may be configured to charge a battery of the environmentally-friendly vehicle by rectifying, boosting, and converting input power (e.g., external alternating current (AC) power) into direct current (DC) power. The OBC may include a power factor corrector (PFC) configured to convert alternating current input power into direct current power and improve power factors.

In this regard, general structures of a unidirectional charging system and a bidirectional charging system of the OBC will be described with reference to FIGS. 1 and 2 of the related art, and based on the description of structures, and a problem that occurs when the bidirectional charging system is applied to a circuit of the OBC in the related art will be described with reference to FIGS. 3 and 4 of the related art. Thereafter, a structure of the OBC, in which a unidirectional operation and a bidirectional operation are interchangeable, and a method of controlling the same according to the exemplary embodiment of the present invention will be described with reference to FIGS. 5, 6, 7A, and 7B.

FIG. 1 is a schematic view illustrating a unidirectional charging system that operates an electric vehicle battery only in a charging mode using power grid electricity in the related art. Referring to FIG. 1, a unidirectional charging system of an OBC for a vehicle broadly has a structure that uses an alternating current power source 110 as an input power source and stores energy in a high-voltage battery 180 using electric vehicle supply equipment (EVSE) 120, a rectifier 130, a power factor corrector (PFC) 140, a DC/AC converter 150, an electric transformer 160, and a rectifier 170. The elements illustrated in FIG. 1 are not the essential elements, and a charging control system having more or fewer elements may be implemented.

Figure 2:
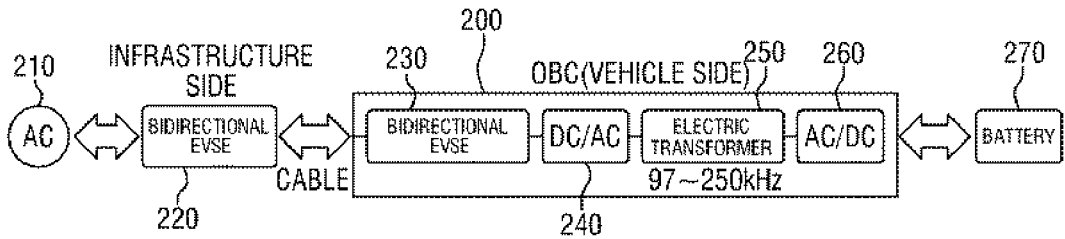
FIG. 2 is a schematic view illustrating a bidirectional charging system that charges and discharges the electric vehicle battery with power using a bidirectional infrastructure in the related art.

FIG. 2 is a schematic view illustrating a bidirectional charging system that charges and discharges the electric vehicle battery with power using a bidirectional infrastructure in the related art. Referring to FIG. 2, a bidirectional charging system of an OBC for a vehicle broadly has a structure that uses an alternating current power source 210 as an input power source and stores energy in a high-voltage battery 270 using bidirectional electric vehicle supply equipment (EVSE) 220, a bidirectional power factor corrector (PFC) 230, a DC/AC converter 240, an electric transformer 250, and an AC/DC converter 260. The elements illustrated in FIG. 2 are not the essential elements, and a charging control system having more or fewer elements may be implemented.

Figure 3:
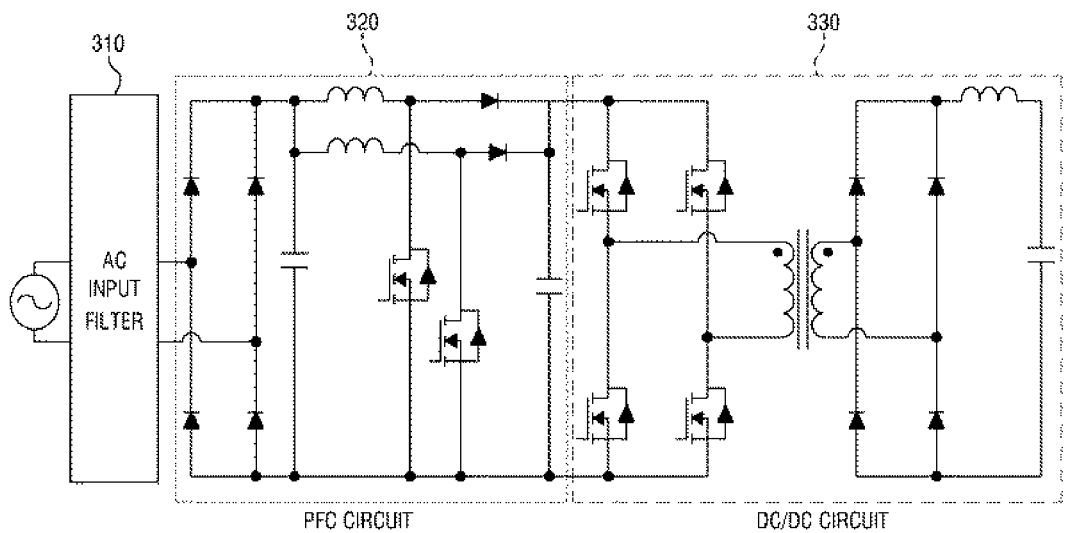
FIG. 3 is a structural view illustrating a structure of a power factor corrector (PFC) and a structure of a DC/DC circuit of a unidirectional on-board charger (OBC) in the related art.
Figure 4:
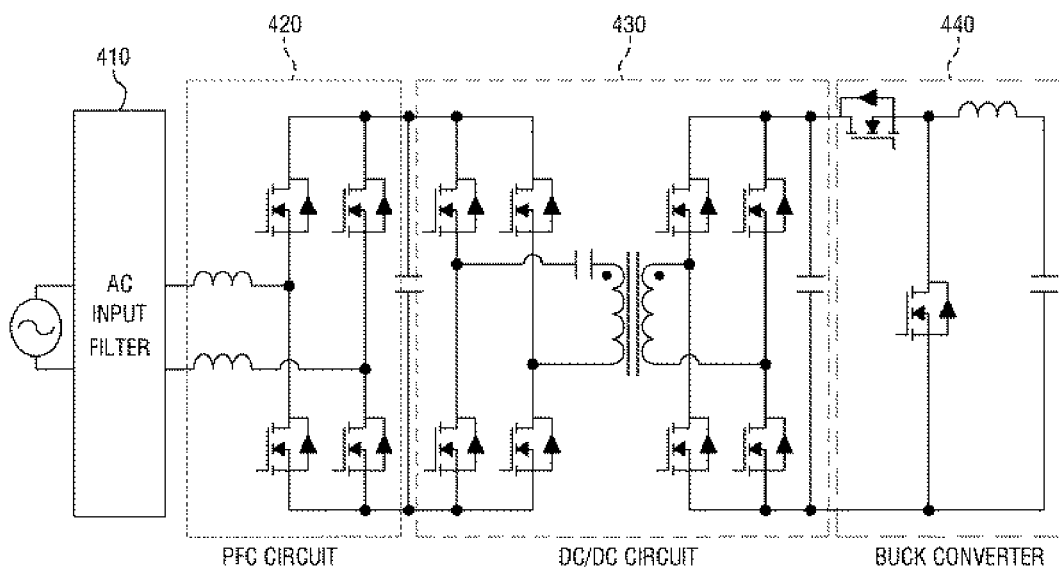
FIG. 4 is a structural view illustrating the structure of the PFC, the structure of the DC/DC circuit, and a structure of a buck converter in which a bidirectional charging system is applied to the OBC in the related art.

FIG. 3 is a structural view illustrating a circuit of the unidirectional OBC in the related art, and FIG. 4 is a structural view illustrating a circuit of the OBC in the related art to which the bidirectional charging system is applied. Referring to FIG. 3, the unidirectional OBC may be configured to charge the high-voltage battery with a voltage, which is applied from an AC input via an AC input filter 310, through a PFC circuit 320 and a DC/DC circuit 330. The PFC circuit 320 is a power factor corrector configured to reduce a loss of power that occurs during a process of converting alternating current power into direct current power. The DC/DC circuit 330 is configured to increase or decrease the voltage and use an output voltage, which is rectified to a direct current voltage by the PFC circuit 320, as an input voltage. Hereinafter, elements of each of the PFC circuit 320 and the DC/DC circuit 330 will be described in detail.

The PFC circuit 320 may include a bridge circuit in which bridge diodes, that is, four diodes are connected. The diode is a semiconductor element that allows an electric current to flow in one direction but prevents the electric current from flowing in a reverse direction, and the diode performs a rectifying action that converts an alternating current into a direct current. The PFC circuit 320 may include a boost converter. The boost converter may be configured to transfer energy stored in an inductor L to a capacitor C and increase the output voltage of the PFC circuit 320 by adjusting a duty ratio for pulse with modulation (PWM).

The DC/DC circuit 330 may use a full bridge to transfer the output voltage of the PFC circuit 320 to the electric transformer. The full bridge may include four switches that alternately switch and output the direct current. The DC/DC circuit 330 is configured to apply the voltage, which is received from the PFC circuit 320 through the full bridge, to the electric transformer, and electrical energy may be stored in a capacitor of an output terminal of the DC/DC circuit 330 by the electric transformer and the rectifier.

Referring to FIG. 4, the bidirectional OBC may be configured to charge the high-voltage battery with voltage, which is applied from an AC input via an AC input filter 410, by using a PFC circuit 420, a DC/DC circuit 430, and a buck converter 440. The PFC circuit 420 may include an inverter structure, the DC/DC circuit 430 may include a full bridge and a bidirectional converter, and the buck converter 440 includes a switching element, an inductor, and a capacitor to decrease the voltage inputted from the DC/DC circuit 430.

When comparing the circuit structure of the unidirectional OBC in FIG. 3 and the circuit structure of the bidirectional OBC in FIG. 4 in the related art referring to the following Table 1, a topology of the PFC circuit needs to be changed in comparison with the unidirectional circuit structure in the related art, the semiconductor element at the secondary side of the DC/DC circuit needs to be changed, and the buck converter circuit needs to be added when the unidirectional circuit structure is changed to the bidirectional circuit structure.

TABLE 1

| Items | | Unidirectional OBC in related art | Bidirectional circuit structure |
| --- | --- | --- | --- |
| Topology | PFC | Bridge diode + | Inverter PFC |

TABLE 1-continued

| Items | Unidirectional OBC in related art | Bidirectional circuit structure |
|---|---|---|
| DC/DC | Boost PFC PSFB | LLC FB (fixed 500 V) + Bidirectional converter |

Specifically, as illustrated in FIGS. 3 and 4, in the unidirectional circuit in the related art, the topology of the PFC circuit is the PFC 320 to which the bridge diode and the boost converter structure are applied, but in the bidirectional circuit, the topology is changed to the PFC 420 to which the inverter structure is applied. In addition, the topology of the DC/DC circuit includes the full bridge in the unidirectional circuit in the related art, but in the bidirectional circuit, as the full bridge to which the bidirectional converter is applied is provided, the semiconductor element at the secondary side is changed, and the buck converter circuit 440 is added. Since the circuit is added as described above, power conversion efficiency deteriorates, the number of components increases, and a size and material costs increase.

A structure of a unidirectionally/bidirectionally interchangeable OBC according to the present invention, which solves the above-mentioned problems of the bidirectional circuit structure in the related art, will be described below in detail.

Figure 5:
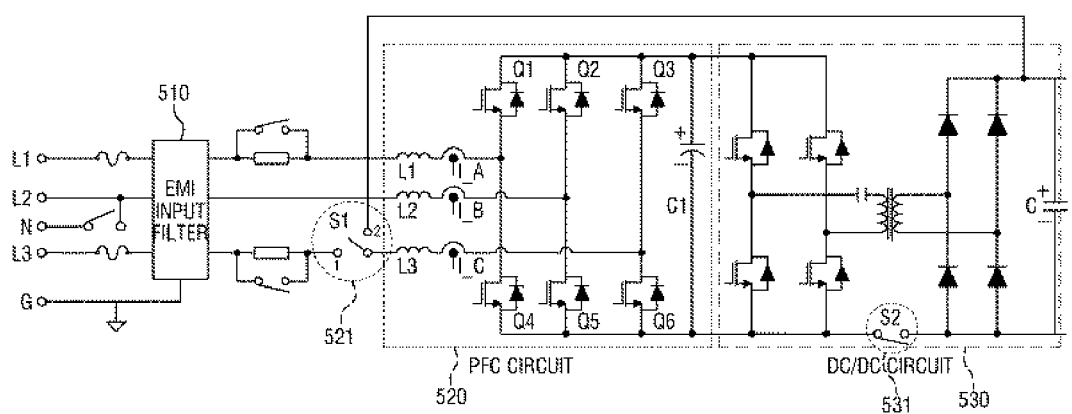
FIG. 5 is a structural view illustrating a structure of a power factor corrector (PFC) and a structure of a DC/DC circuit of a bidirectional on-board charger (OBC) according to an exemplary embodiment of the present invention.

FIG. 5 is a structural view illustrating a structure of a power factor corrector (PFC) and a structure of a DC/DC circuit of a bidirectional on-board charger (OBC) according to an exemplary embodiment of the present invention. Referring to FIG. 5, the bidirectional OBC according to the exemplary embodiment of the present invention broadly has a structure that uses an alternating current power source as an input power source and stores energy in the high-voltage battery using an electromagnetic interference (EMI) filter 510, a PFC circuit 520, and a DC/DC circuit 530. The elements illustrated in FIG. 5 are not the essential elements, and a bidirectional OBC having more or fewer elements may be implemented.

Hereinafter, the elements of the PFC circuit 520 according to the exemplary embodiment of the present invention will be described in detail. Referring to FIG. 5, the PFC circuit 520 according to the exemplary embodiment of the present invention is a 3-leg PFC circuit for three-phase charging and may include a first switch S1 (521), inductors L1, L2, and L3, switching modules Q1, Q2, Q3, Q4, Q5, and Q6, and a capacitor C1. Regarding the 3-leg PFC circuit for three-phase charging, it is increasingly necessary to reduce charging time as a capacity of a battery is increased to increase a traveling distance, and thus an infrastructure for enabling high-capacity charging is implemented, and as a result, development on a high-capacity OBC for coping with single-phase/three-phase inputs is being conducted.

In the exemplary embodiment of the present invention, the switching modules Q1, Q2, Q3, Q4, Q5, and Q6 may include field effect transistors (FETs) and are configured to increase voltages. When a voltage is applied to a gate, an electric current flows from a drain to a source or from the source to the drain.

The following electric current may vary based on a magnitude of the voltage applied to the gate, and, the FET may be used to perform a switching function in the exemplary embodiment of the present invention. In the exemplary embodiment of the present invention, as illustrated in FIG. 5, the first switch S1 (521) may connect any one of a first line for connecting the input power source and the PFC circuit 520 and a second line for connecting the PFC circuit 520 and an output terminal of the DC/DC circuit 530.

Referring to FIG. 5, the DC/DC circuit 530 according to the exemplary embodiment of the present invention may include a full bridge, an electric transformer, a bridge diode, a second switch S2 (531), and a capacitor C. The full bridge may include four switches (e.g., FETs) that alternately switch and output the direct current. The second switch S2 (531) may be disposed between a switching unit (full bridge) and an output terminal (capacitor C) of the DC/DC circuit 530 and selectively connect the switching unit and the output terminal.

The unidirectionally/bidirectionally interchangeable OBC according to the present invention enables a bidirectional power transfer by applying the two switches S1 and S2 to an OBC structure for responding to the single-phase/three-phase inputs, and as a result, there is an advantage in that power conversion efficiency is improved and material costs and a size are not increased in comparison with the circuit in the related art since the bidirectional power transfer is enabled only by adding the two switches S1 and S2.

The OBC according to the exemplary embodiment of the present invention is designed to be unidirectionally/bidirectionally interchangeable by a hybrid control technique using the two switches S1 and S2. The hybrid control technique using the two switches S1 and S2 will be specifically described below.

Figure 6:
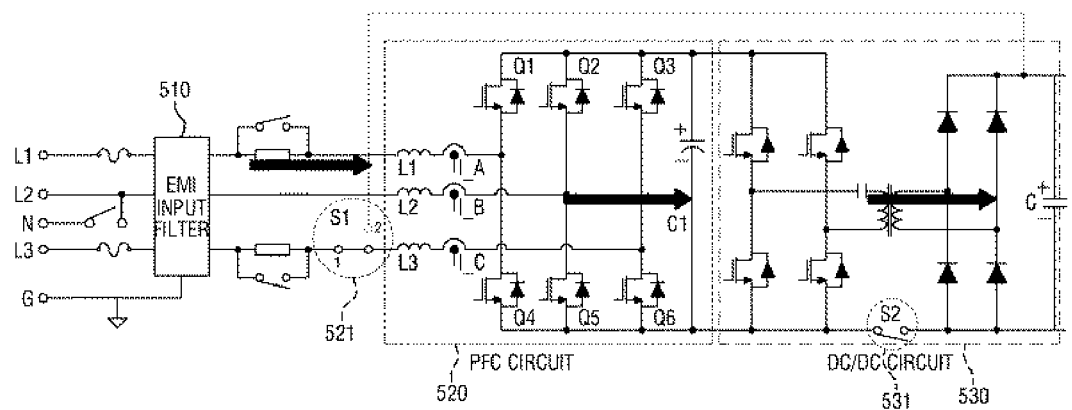
FIG. 6 is a structural view illustrating a charging operation of the bidirectional OBC according to the exemplary embodiment of the present invention.

FIG. 6 is a structural view illustrating a charging operation of the bidirectional OBC according to the exemplary embodiment of the present invention. Referring to FIG. 6, the first switch S1 (521) may connect the first line 1 for connecting the input power source and the PFC circuit 520, and the second switch S2 may be turned off. In particular, as indicated by the arrow in FIG. 6, the power energy from the input power source may be stored in the high-voltage battery via the EMI input filter 510, the PFC circuit 520, and the DC/DC circuit 530. This indicates the charging operation of the OBC having a circuit structure in which the PFC circuit and an isolated DC/DC circuit is combined.

Figure 7A:
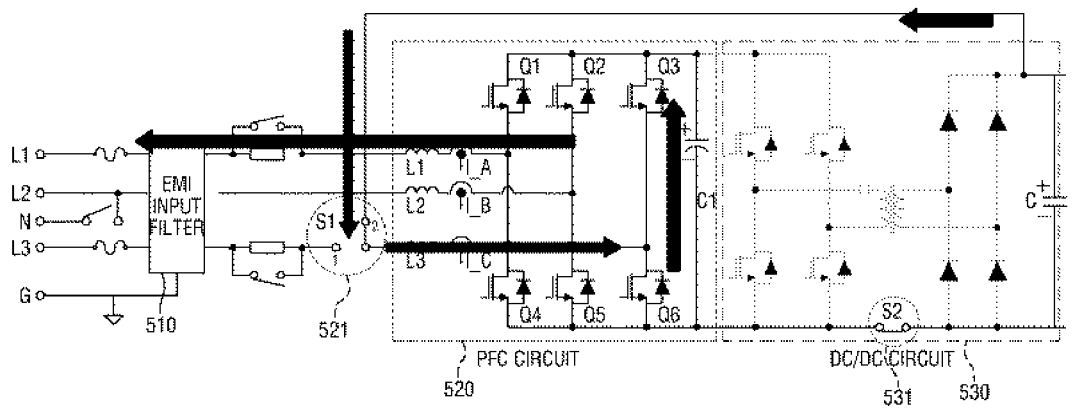
FIG. 7A is a structural view illustrating a discharging operation the bidirectional OBC according to the exemplary embodiment of the present invention.

FIG. 7A is a structural view illustrating a discharging operation the bidirectional OBC according to the exemplary embodiment of the present invention. Referring to FIG. 7A, the first switch S1 (521) may connect the second line 2 for connecting the PFC circuit 520 and the output terminal of the DC/DC circuit 530, and the second switch S2 (531) may be turned on. In particular, as indicated by the arrow in FIG. 7A, the power energy stored in the high-voltage battery may be transferred directly to the PFC circuit 520 from the output terminal C of the DC/DC circuit 530, and for example, the power energy may be transferred to the input power source via the EMI input filter 510 after sequentially passing through the inductor L3, the first switching module Q6, the capacitor C1, and the second switching module Q2 of the 3-leg PFC circuit 520.

Figure 7B:
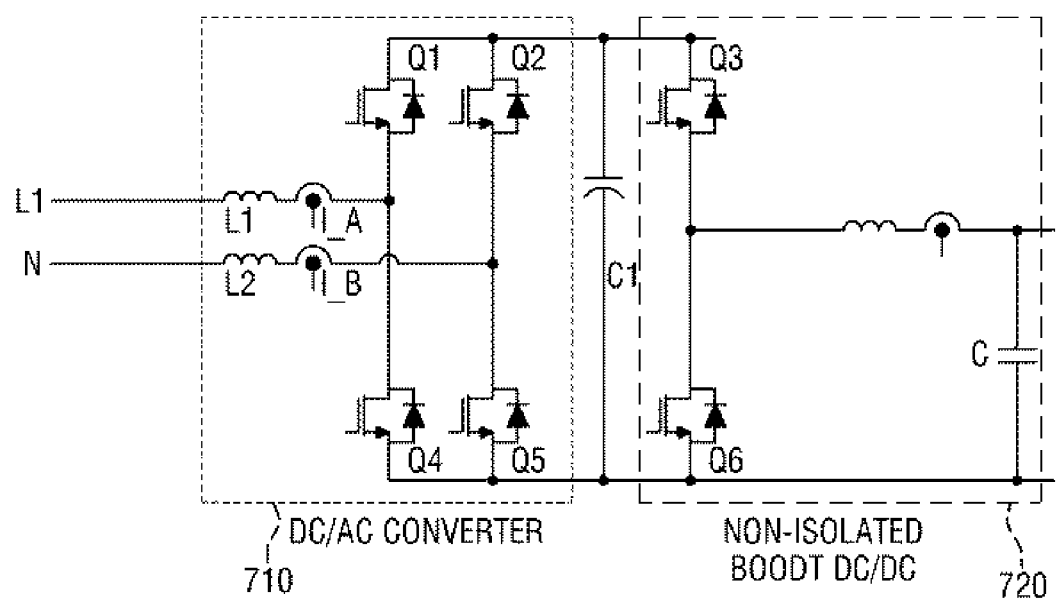
FIG. 7B is a structural view illustrating an equivalent circuit to the structural view of FIG. 7A.

As illustrated in FIG. 7B illustrating an equivalent circuit to the circuit in FIG. 7A, the above-mentioned operation is the discharging operation of the OBC having the circuit structure in which a non-isolated DC/DC circuit 720 and a DC/AC converter 710 are combined. Referring to the equivalent circuit during a discharging operation illustrated in FIG. 7B, the discharging operation of the OBC utilizes one leg of the 3-leg PFC circuit as the boost converter 720 and performs the DC/AC conversion and discharging 710 using the remaining two legs.

Figure 8:
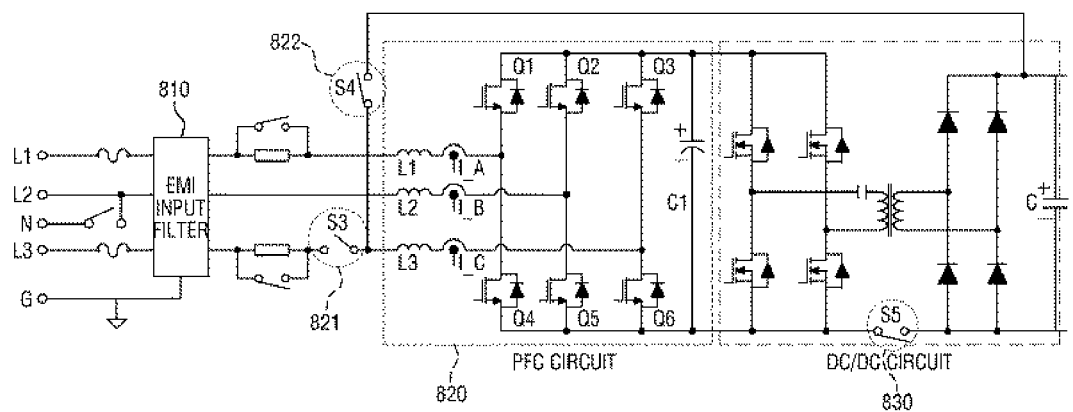
FIG. 8 is a structural view illustrating a structure of a power factor corrector (PFC) and a structure of a DC/DC circuit of a bidirectional on-board charger (OBC) according to another exemplary embodiment of the present invention.

FIG. 8 is a structural view illustrating a structure of a PFC 820 and a structure of a DC/DC circuit 830 of a bidirectional OBC according to another exemplary embodiment of the present invention. FIG. 8 illustrates a structure in which three switches S3, S4, and S5 are applied instead of the two switches S1 and S2 in the structure illustrated in FIG. 5.

In still another exemplary embodiment of the present invention, as illustrated in FIG. 8, the third switch S3 (821) may be disposed between an input power source and an input terminal of the PFC circuit 820 and may selectively connect the input power source and the input terminal of the PFC circuit 820, and the fourth switch S4 (822) may be disposed between the input power source and an output terminal of the DC/DC circuit 830 and may selectively connect the input power source and the output terminal of the DC/DC circuit 830. In addition, the fifth switch S5 (831) may be disposed between a switching unit (full bridge) of the DC/DC circuit 830 and an output terminal (capacitor C) and may selectively connect the switching unit and the output terminal.

In the OBC structure according to still another exemplary embodiment of the present invention as illustrated in FIG. 8, the third switch S3 (821) may be turned on, the fourth switch S4 (822) may be turned off, and the fifth switch S5 (831) may be turned off during a charging operation. During a discharging operation, the third switch S3 (821) may be turned off, the fourth switch S4 (822) may be turned on, and the fifth switch S5 (831) may be turned on.

The charging/discharging method of the bidirectional OBC using the hybrid control technique will be described below step by step.

First, the charging operation of the bidirectional OBC may performed by turning on the first switch S1 included in the PFC of the OBC to connect the first line for connecting the input power source of the OBC and the PFC, turning off the second switch S2 connected between the switching unit and the output terminal of the DC/DC circuit of the OBC; and starting, by the OBC, the charging operation when the first switch S1 is turned on and the second switch S2 is turned off to connect the first line.

Further, the discharging operation of the bidirectional OBC may be performed by turning on the first switch S1 included in the PFC of the OBC to connect the second line for connecting the PFC and the output terminal of the DC/DC circuit of the charger, turning on the second switch S2 connected between the switching unit and the output terminal of the DC/DC circuit, and starting, by the OBC, the discharging operation when the first switch S1 is turned on and the second switch S2 is turned on to connect the second line.

For example, during a power transfer such as V2G (vehicle to grid), V2V (vehicle to vehicle), and V2H (vehicle to home) (i.e., during a power discharging operation of a vehicle battery), a 1-leg of the 3-leg PFC circuit terminal may be used as DC/DC power converter through the hybrid control technique. Therefore, there is an advantage in that it may be possible to design the bidirectional OBC only by adding the two switches S1 and S2 without changing the topology of the unidirectional OBC in the related art or adding another circuit.

While the present invention has been described in detail above with reference to the representative exemplary embodiment, those skilled in the art to which the present invention pertains will understand that the exemplary embodiment may be variously modified without departing from the scope of the present invention. Accordingly, the scope of the present invention should not be limited to the described exemplary embodiment, but should be defined not only by the appended claims but also by all changes or modified forms induced from an equivalent concept to the claims.

What is claimed is:

1. A bidirectional on-board charger, comprising:
   an input power source which is a power source of a charging system;
   a power factor corrector (PFC) connected to the input power source;
   a direct current/direct current (DC/DC) circuit connected to the power factor corrector and having a switching unit and an output terminal;
   a first switch that connects any one of; a first line for connecting the input power source and the power factor corrector, or a second line for connecting the power factor corrector and an output terminal of the DC/DC circuit; and
   a second switch disposed between the switching unit and the output terminal of the DC/DC circuit and that selectively connects the switching unit and the output terminal.

2. The bidirectional on-board charger of claim 1, wherein the first switch is turned on and the second switch is turned off to connect the first line during a charging operation.

3. The bidirectional on-board charger of claim 1, wherein the first switch is turned on and the second switch is turned on to connect the second line during a discharging operation.

4. A bidirectional on-board charger, comprising:
   an input power source which is a power source of a charging system;
   a power factor corrector (PFC) connected to the input power source;
   a direct current/direct current (DC/DC) circuit connected to the power factor corrector and having a switching unit and an output terminal;
   a third switch disposed between the input power source and an input terminal of the power factor corrector and that selectively connects the input power source and the input terminal of the power factor corrector;
   a fourth switch disposed between the input power source and an output terminal of the DC/DC circuit and that selectively connects the input power source and the output terminal of the DC/DC circuit; and
   a fifth switch disposed between the switching unit and the output terminal of the DC/DC circuit and that selectively connects the switching unit and the output terminal.

5. The bidirectional on-board charger of claim 4, wherein the third switch is turned on, the fourth switch is turned off, and the fifth switch is turned off during a charging operation.

6. The bidirectional on-board charger of claim 4, wherein the third switch is turned off, the fourth switch is turned on, and the fifth switch is turned on during a discharging operation.

7. The bidirectional on-board charger of claim 4, wherein the power factor corrector is a 3-leg PFC for a three-phase charging.

8. The bidirectional on-board charger of claim 4, wherein the DC/DC circuit includes an electric transformer, a full bridge at a primary side of the electric transformer, a bridge diode at a secondary side of the electric transformer, and a capacitor at the output terminal.

9. The bidirectional on-board charger of claim 4, wherein a high-voltage battery is connected to the output terminal of the DC/DC circuit.

10. A method of controlling a bidirectional on-board charger, the method comprising:
- turning on, by a controller, a first switch included in a power factor corrector of the bidirectional on-board charger to connect a first line for connecting an input power source and the power factor corrector of the bidirectional on-board charger;
- turning off, by the controller, a second switch connected between a switching unit and an output terminal of a direct current/direct current (DC/DC) circuit of the bidirectional on-board charger; and
- starting, by the bidirectional on-board charger, a charging operation when the first switch is turned on and the second switch is turned off so that the first line is connected.

11. A method of controlling a bidirectional on-board charger, the method comprising:
- turning on, by a controller, a first switch included in a power factor corrector of the bidirectional on-board charger to connect a second line for connecting the power factor corrector and an output terminal of a direct current/direct current (DC/DC) circuit of the bidirectional on-board charger;
- turning on, by the controller, a second switch connected between a switching unit and the output terminal of the DC/DC circuit; and
- starting, by the bidirectional on-board charger, a discharging operation when the first switch is turned on and the second switch is turned on so that the second line is connected.

* * * * *